(12) United States Patent  
Nishiyama et al.

(10) Patent No.: US 11,886,300 B2
(45) Date of Patent: Jan. 30, 2024

(54) DATA DUPLICATION SYSTEM AND BACKUP METHOD

(71) Applicant: Hitachi, Ltd., Tokyo (JP)

(72) Inventors: Shunsuke Nishiyama, Tokyo (JP); Kenichi Oyamada, Tokyo (JP); Hiroki Mera, Tokyo (JP); Goro Kazama, Tokyo (JP)

(73) Assignee: HITACHI, LTD., Tokyo (JP)

(*) Notice: Subject to any disclaimer, the term of this patent is extended or adjusted under 35 U.S.C. 154(b) by 0 days.

(21) Appl. No.: 17/886,394

(22) Filed: Aug. 11, 2022

(65) Prior Publication Data

US 2023/0185673 A1 Jun. 15, 2023

(30) Foreign Application Priority Data

Dec. 9, 2021 (JP) .................. 2021-199786

(51) Int. Cl.
*G06F 12/00* (2006.01)
*G06F 11/14* (2006.01)

(52) U.S. Cl.
CPC ...... *G06F 11/1458* (2013.01); *G06F 11/1451* (2013.01)

(58) Field of Classification Search
CPC .. G06F 11/1458; G06F 11/1451; G06F 12/02; G06F 12/14; G06F 12/16; G06F 3/0683; G06F 3/0647; G06F 3/065
See application file for complete search history.

(56) References Cited

U.S. PATENT DOCUMENTS

2006/0112245 A1 5/2006 Ikegaya et al.
2010/0125712 A1* 5/2010 Murase ............... G06F 11/1458
 711/E12.001
2020/0364115 A1 11/2020 Tanaka et al.

FOREIGN PATENT DOCUMENTS

JP 2006-146801 A 6/2006
JP 2020-187633 A 11/2020

* cited by examiner

*Primary Examiner* — Shawn X Gu
(74) *Attorney, Agent, or Firm* — Procopio, Cory, Hargreaves & Savitch LLP

(57) ABSTRACT

The data duplication system comprises a first storage device having a first data protection area for storing backup images of multiple generations of a first volume for data read/write by an external device. The first data protection area is inaccessible to the external device. A second storage device coupled to the first storage device. The first storage device creates a second volume for storing a backup image of a particular generation of the plurality of generations of backup images stored in the first data protection area. The second storage device creates a third volume for storing the copy data, and a virtual volume that is mapped to the second volume of the first storage device. The second storage stores the backup data of a specific generation stored in the second volume in the third volume via the virtual volume by forming a pair that copies the data in the virtual volume and the third volume.

9 Claims, 20 Drawing Sheets

FIG. 5

TIERED INFORMATION 500

| EXPORT VOLUME ID (501) | ACCESS VOLUME ID (VOLUME TO BE ACCESSED) (502) | TIED COPY NUMBER (503) |
|---|---|---|
| 12 | 13 | 3 |
| ... | | |

FIG. 6

ACCESS VOL BACKUP AVAILABLE TIME PERIOD INFORMATION 600

| STORAGE ID (601) | EXPORT VOLUME ID (602) | ACCESSED VOLUME ID (FOR BACKUP) (603) | PREPARATION START TIME (604) | ACCESS AVAILABLE START TIME (605) | ACCESSIBLE END TIME (606) |
|---|---|---|---|---|---|
| 10 | 12 | 13 | 09:30:00 | 10:00:00 | 19:00:00 |
| 10 | 12 | 13 | 21:30:00 | 22:00:00 | 07:00:00 |
| ... | | | | | |

FIG. 7A

EXTERANAL MAPPING INFORMATION 700

| VIRTUAL VOL 701 (EXTERNAL SOURCE STORAGE) | EXTERNAL DESTINATION STORAGE ID | ACCESSED VOL ID (EXTERNAL DESTINATION STORAGE) | CONNECTION STATUS (CONNECT / DISCONNECT) |
|---|---|---|---|
| 21 | 10 | 16 | CONNECT |
| ... | | | |

FIG. 7B

EXTERANAL MAPPING INFORMATION 710

| VIRTUAL VOL 701 (EXTERNAL SOURCE STORAGE) | EXTERNAL DESTINATION STORAGE ID | ACCESSED VOL ID (EXTERNAL DESTINATION STORAGE) | CONNECTION STATUS (CONNECT / DISCONNECT) |
|---|---|---|---|
| 32 | 10 | 13 | CONNECT |
| 34 | 10 | 16 | DISCONNECT |
| ... | | | |

FIG. 8

BACKUP DATA MANAGEMENT INFORMATION 800

| VOLUME ID | BACKUP DATE AND TIME | COPY ACQUISITION DATE AND TIME |
|---|---|---|
| 33a | 2021-10-01 08:00:00 | 2021-10-01 08:35:24 |
| 33b | 2021-10-01 20:00:00 | 2021-10-01 20:30:08 |
| ... | | |

801 — VOLUME ID
802 — BACKUP DATE AND TIME
803 — COPY ACQUISITION DATE AND TIME

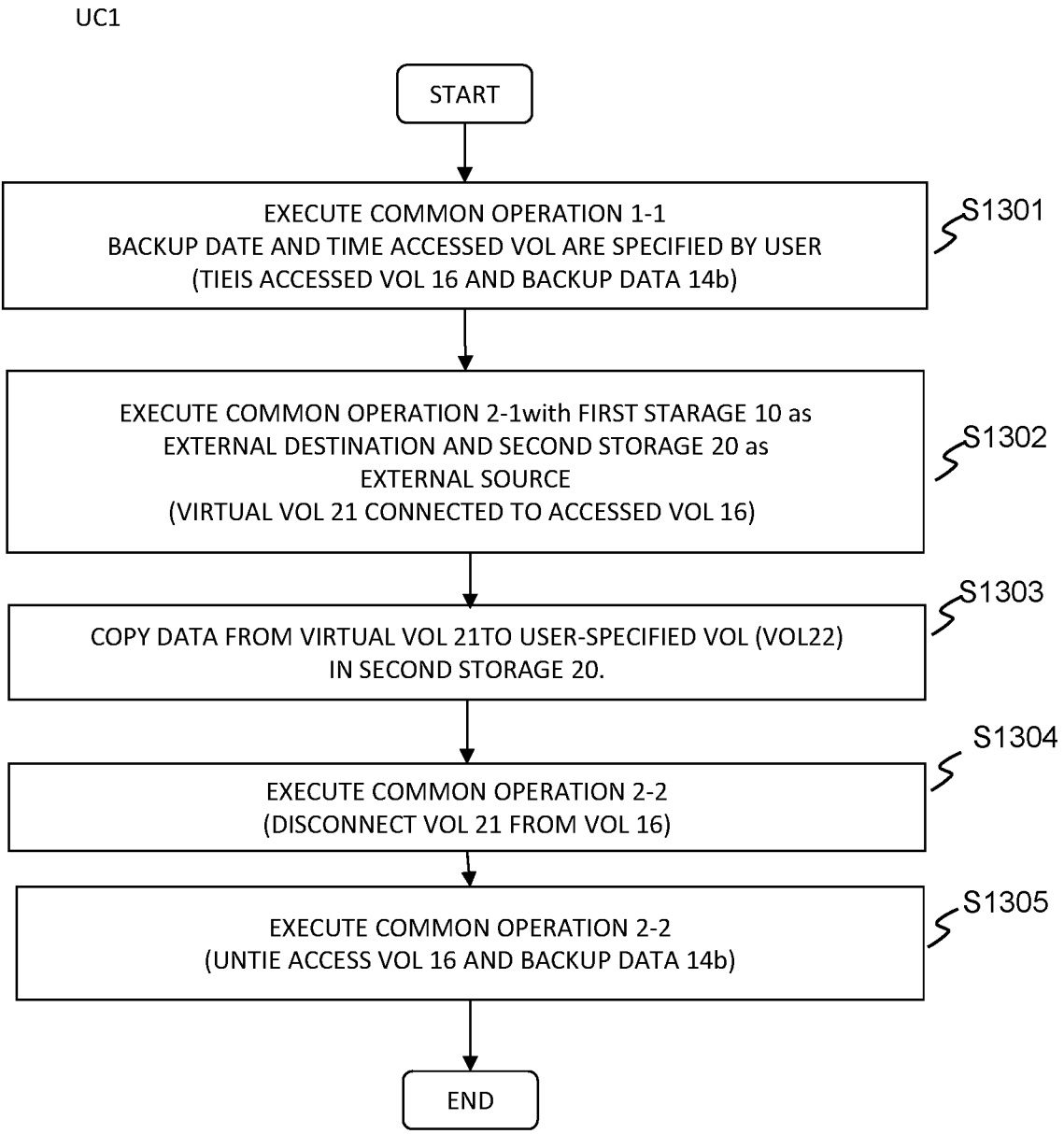

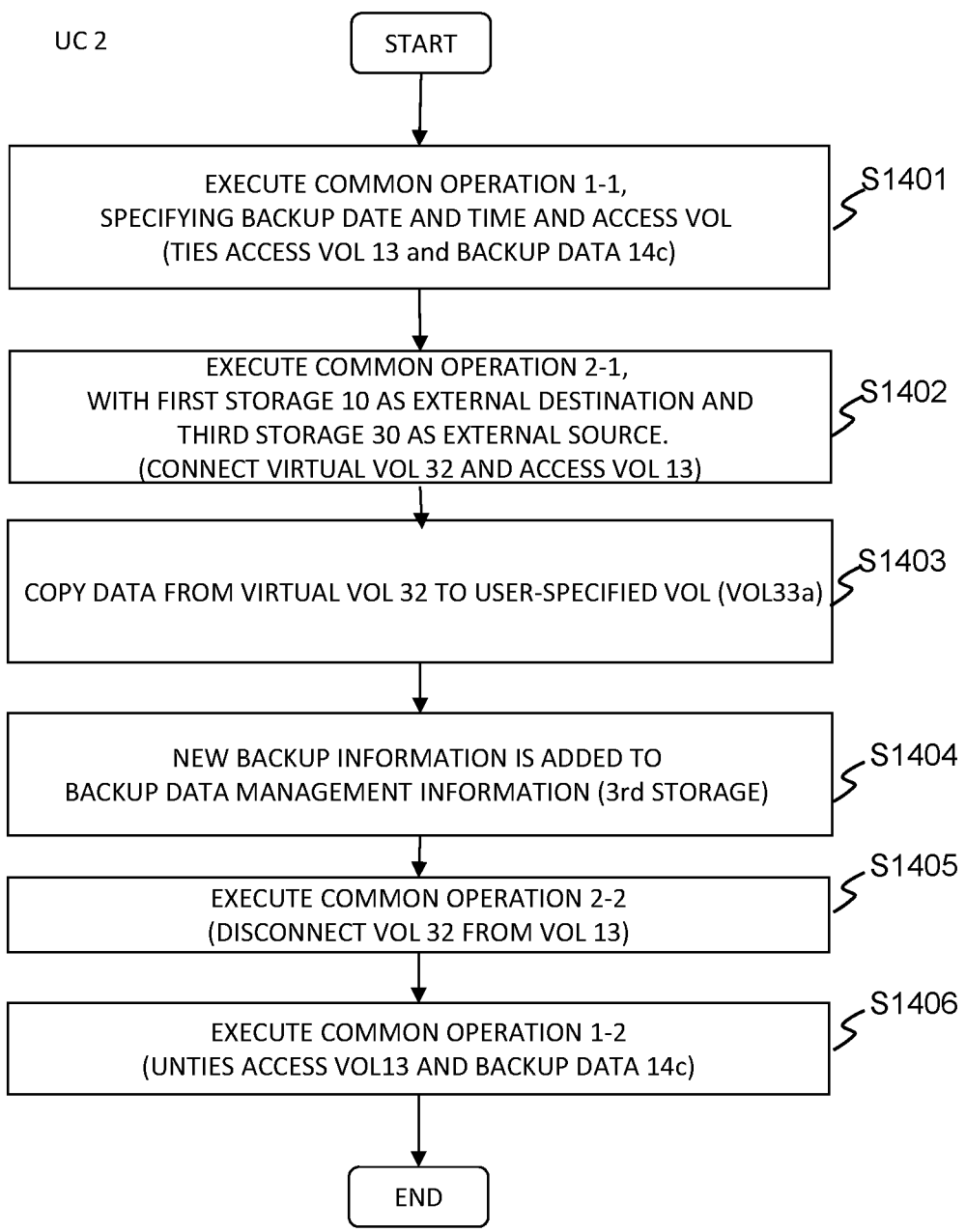

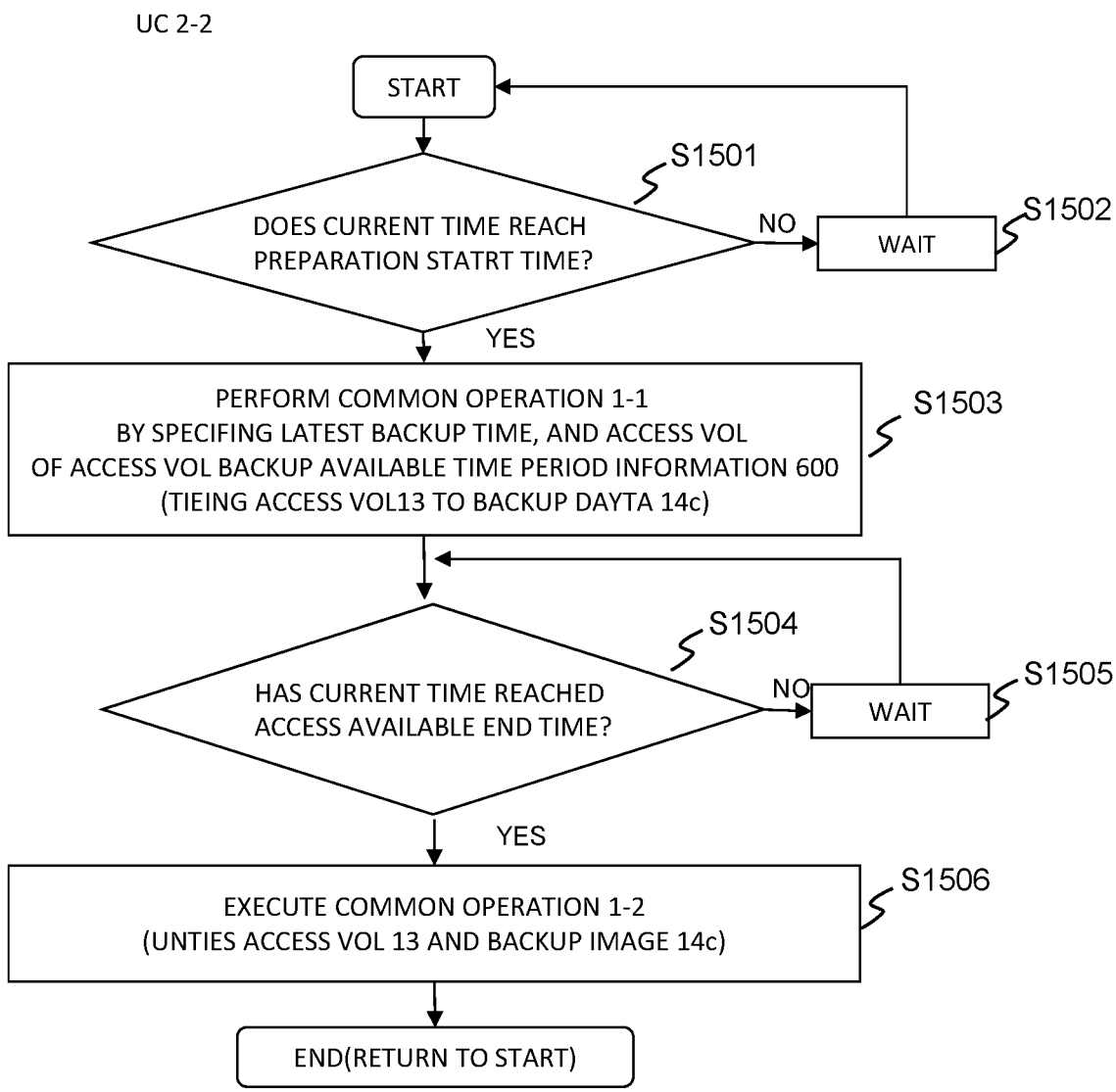

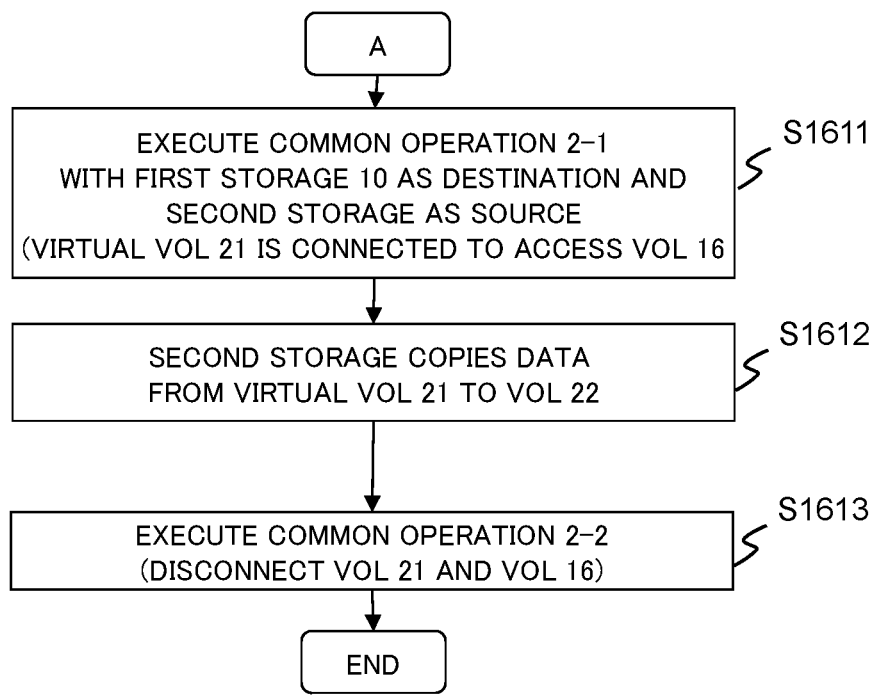

DATA DUPLICATION SYSTEM AND BACKUP METHOD

BACKGROUND OF THE INVENTION

Field of the Invention

This invention relates to a data duplication system and a backup method.

Description of the Related Art

Remote copy is a technique for storing backup data at a remote site and restoring the data using the backup data in the event of a failure. For example, JP2006-146801A, which discloses remote copy, and a technique to restrict access remote cite volume from each host computer to prevent from accidentally destroying the data in the remote cite volume.

On the other hand, JP2020-187633A is a technology for restoring a production volume to the state before a cyber-attack. JP2020-187633A discloses a technique for storing multiple generations of a production volume as backup images in a storage area (data protection area) that cannot be accessed externally, selecting one generation from the multiple generations, storing a copy of the selected generation in an externally accessible volume (access volume), and restoring the data of the selected generation.

Although JP2006-146801A can prevent data destruction of volumes by host computers without access privileges, it cannot respond to the diversification of cyber-attacks.

In JP2020-187633A, data cannot be restored in the event of a failure of a storage system with a data protection area. In addition, in JP2020-187633A, the data in the access volume (volume to be accessed, hereinafter "access volume") is not always located near the host computer that performs the data verification to confirm that it has not been cyber-attacked, and therefore, access to the data stored in the access volume cannot be accelerated.

Fault tolerance can be improved if data stored in the data protection area can be copied to storage at a remote site or at a site near the host computer where data verification is performed.

In addition, if a copy of the data stored in the access volume can be stored in storage near the host computer where data verification is performed, data verification can be accelerated.

However, in the remote copy of the JP2006-146801A, where data is stored in remote storage, the access volume of the production site's storage becomes the primary volume of the remote copy, and it is necessary to give the administrator of the production site storage the authority to manage the storage at the local site or at a remote site. Granting this administrative authority creates the risk of a cyber-attack from the production site storage to the local or remote site storage. This problem arises similarly with remote copying, since a copy of the data on the access volume for which data verification is performed is stored on storage that resides near the host computer.

Furthermore, in order to prevent data tampering, the data in the access volume must be copied to other storage in a state where it cannot be written from the outside. Therefore, the technology of JP2006-146801A, which allows writing to the primary volume, cannot be adapted to JP2020-187633A, since the technology of JP2006-146801A, which allows writing to the primary volume.

SUMMARY OF THE INVENTION

The present invention is to solve the above problems. That is, one of the purposes of the present invention is to provide a data duplication system and a backup method for copying a specific generation of images from a storage having a data protection area to a remote storage, while responding to cyber-attacks.

To solve the above problem, an aspect of the data duplication system is a first storage having a first volume for reading and writing data by an external device, and a first data protection area for storing backup images of multiple generations of the first volume and that cannot be accessed by external devices; a second storage being coupled to the first storage. The first storage creates a second volume for providing a particular generation of the plurality of generations of backup images stored in the first data protection area. The second storage creates a third volume for storing data comprising the specific generation of backup provided by the second volume, creates a first virtual volume forming a pair that copies the data to the third volume, makes the second volume accessible via the first virtual volume by mapping the first virtual volume as the external source and the second volume of the first storage device as the external destination, reads a backup image of the second volume through the first virtual volume by copying data from the first virtual volume to the third volume, and stores the data comprising the backup image of the specific generation in said third volume by writing to said third volume.

This invention can improve fault tolerance while responding to cyber-attacks.

BRIEF DESCRIPTION OF THE DRAWINGS

FIG. 5 shows an example of the tied information between copy number and access vol in this embodiment;

FIG. 6 shows an example of the access Vol backup available time period information in this embodiment;

FIG. 7A shows an example of the external storage mapping information maintained by the second storage 20 in this embodiment;

FIG. 7 B shows an example of the external storage mapping information maintained by the third storage 30 in this embodiment;

FIG. 8 shows an example of backup data management information managed by the third storage in this embodiment;

FIG. 13 is a flowchart showing an example of the process of restoring to a normal volume for use case 1 (UC1) in this embodiment;

FIG. 14 is a flowchart showing an example of the process of backup to the second protected area for use case 2 (UC2) in this embodiment;

FIG. 15A is a flowchart showing an example of the process of backup to the second protected area, use case 2 (UC2) in this embodiment;

FIG. 16 B is a flowchart showing an example of the restore process, combining use case 2 and use case 1 in this embodiment (UC2+UC1);

DETAILED DESCRIPTION OF THE PREFERRED EMBODIMENTS

Figure 1:
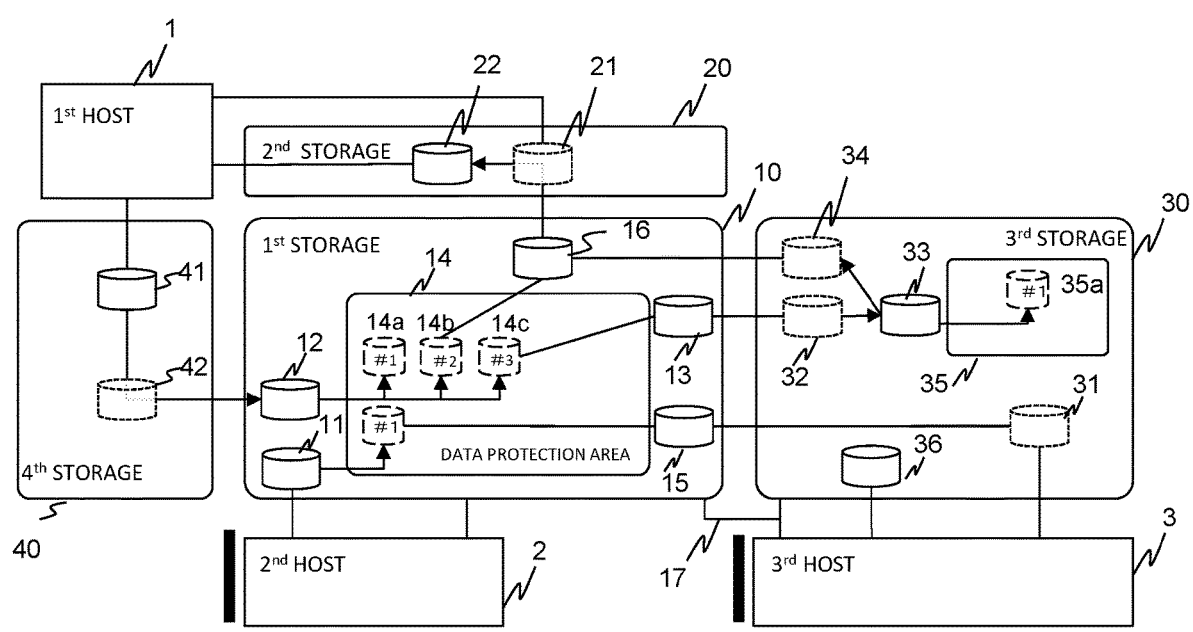
FIG. 1 shows an example of the overall configuration of the system.

The following are examples of the invention with reference to the drawings. The examples are illustrative examples to explain the invention, and have been omitted and simplified as appropriate for the sake of clarity of explanation. The invention can also be implemented in various other forms. Unless otherwise limited, each component may be singular or plural.

The position, size, shape, extent, etc. of each component shown in the drawings may not represent the actual position, size, shape, extent, etc., in order to facilitate understanding of the invention. Therefore, the invention is not necessarily limited to the position, size, shape, range, etc. disclosed in the drawings.

Examples of various types of information may be described in terms of "tables," "lists," "queues," etc., but various types of information may be expressed in data structures other than these. For example, "XX table", "XX list", "XX queue", etc. may be expressed as "XX information". When describing identification information, expressions such as "identification information," "identifier," "name," "ID," and "number" are used, but these can be substituted for each other.

When there are multiple components having the same or similar functions, the same code may be explained with different subscripts. When there is no need to distinguish between these multiple components, subscripts may be omitted.

In the example, the processing performed by executing the program may be described. Here, the computer executes the program using a processor (e.g., CPU, GPU) and performs the processing specified in the program while using storage resources (e.g., memory) and interface devices (e.g., communication ports). Therefore, the processor may be the main body of the processing performed by executing the program. Similarly, the subject of the processing performed by executing the program may be a controller, device, system, computer, or node with a processor. The entity of the processing performed by executing the program may be an arithmetic unit, and may include a dedicated circuit that performs a specific processing. Here, dedicated circuits are, for example, FPGA (Field Programmable Gate Array) and ASIC (Application Specific Integrated Circuit), and CPLD (Complex Programmable Logic Device), etc.

The program may be installed on a computer from a program source. The program source may be, for example, a program distribution server or a storage medium readable by the computer. If the program source is a program distribution server, the program distribution server may include a processor and a storage resource that stores the program to be distributed, and the processor of the program distribution server may distribute the program to other computers. In the example, two or more programs may be realized as one program, or one program may be realized as two or more programs.

In the following descriptions, "host computer (host)" and "computer system" are systems containing one or more physical computers. A physical computer may be a general-purpose computer or a dedicated computer. A physical computer (e.g., called a host computer or server system) may function as a computer that issues I/O (Input/Output) requests, or a computer that responds to I/O requests and performs. It may function as a computer that performs I/O of data (e.g., a storage device).

The computer system may be a distributed system consisting of one or more (typically multiple) physical node devices. The physical node devices are physical computers.

In addition, a physical computer (e.g., a node device) may execute predetermined software to build a SDx (Software SDx may include, for example, SDS (Software Defined Storage) or SDDC (Software Defined Data Center).

For example, a storage system as an SDS may be constructed by software with storage functionality being executed on a physical, general-purpose computer.

Also, at least one physical computer (e.g., a storage device) may be running with one or more virtual computers as the server system and the storage controller of the storage system (typically a device that inputs/outputs data to/from the I/O section). A virtual computer as a device that inputs and outputs data to and from the PDEV section in response to I/O requests may be executed.

In other words, such at least one physical computer may function both as at least part of a server system and as at least part of a storage system.

The computer system (typically a storage system) may also have redundant configuration groups. Redundant configurations can be multiple node configurations such as Erasure Coding, RAIN (Redundant Array of Independent Nodes) and inter-node mirroring. It may be configured in a device or in one or more of the PDEV sections as at least a part of the PDEV section. It can be configured in a single computer (e.g., node device) as in a RAID (Redundant Array of Independent (or Inexpensive) Disks) group. It may be configured in a single computer (e.g., node device).

In the following description, identification numbers are used as identification information for various objects, but other types of identification information (e.g., identifiers containing alphanumeric characters or codes) may be employed.

The following is a detailed description of the embodiment with reference to the drawings.

Example 1

<Overview>

FIG. 1 shows an example of the overall configuration of the system.

The first host 1 is connected to the fourth storage 40, and issues I/O requests to the production volume 41 in order to store and read data in the production volume 41 of the fourth storage 40. The fourth storage 40 is installed in the short distance of the first host 1. The fourth storage 40 has a production volume 41 and a virtual volume 42. The virtual volume is virtually created by SI (ShadowImage is trademark of Hitachi, Ltd., ShadowImage is a feature that allows you to quickly create a replica (duplicate or copy) of a volume that is online and in use, without going through a host (host-free). The source volume is called the primary volume and the destination volume is called the secondary volume), which is a secondary volume of the production volume 41.

The first storage 10 is connected to the fourth storage 40 and is located away from the fourth storage 40. The first storage 10 includes a management data volume 11, an export volume 12, a volume 13 (volume for access, in other words, volume 13 to be accessed from outside devices, hereinafter accessed volume 13), a data protection area 14, a management data volume 15, an access volume 16. The export volume 12 is mapped to a virtual volume 42 with external storage mapping information (FIG. 7) and is the destination of data in virtual volume 42, where a copy of the data in production volume 41 is stored. This external storage mapping information is used, for example, by the external storage function (UVM: Universal Volume Manager) realized by Hitachi, Ltd. The UVM function is a function that integrates multiple disk arrays of different models as if they were a single disk array using virtualization technology. By connecting external storage devices and mapping their logical volumes, multiple disk arrays of different models can be treated as if they were a single disk array.

The management data volume 11 contains backup data management information 300 (FIG. 3), access VOL information 400 (FIG. 4), tiered information 500 (FIG. 5), and access volume backup available time period information 600 (FIG. 6). The data protection area 14 is an area that cannot be accessed from the outside of the first storage 10. This area is composed of a storage area where information for external access is not provided to external devices and can only be recognized by the storage controller of the first storage 10. For example, if the data protection area 14 consists of multiple volumes, it can be configured so that the volume ID required to access the data is not provided externally.

A backup image 14a, a backup image 14b, and a backup image 14c are backup images at different points in time of the export volume 12. Thin Image of Hitachi Ltd, is used to create backup images 14a, 14b, and 14c from export volume 12. Thin Image creates a duplicate of the volume in the storage system by storing only the differences from the primary volume. However, other realization methods may be adopted as long as the function is to acquire the data constituting the backup image at the specified point in time in the export volume 12. It may also be a backup function that can store the data comprising the backup image in another volume. Hereafter, the data consisting of the backup data at a given point in time may be referred to as the backup image.

When creating backup images 14a, 14b, and 14c, the storage controller of the first storage 10 assigns copy numbers #1, #2, and #3 to each image in accordance with instructions from the second host 2, and manages them in the backup data management information 300 of the management data volume 11. Each backup image 14a, 14b, 14c can be called a generation of the export volume 12 at a different point in time, since each backup image will be an image at a specified point in time of the export volume 12.

In the example in FIG. 1, the backup image 14a is assigned copy number #1, the backup image 14b is assigned copy number #2, and the backup image 14c is assigned copy number #3.

By tying the backup image of a specific point in time (specific generation) of the export volume 12 to the access volume 13 (volume for access from outside device), the backup image of the specific generation is provided to a second storage 20 or the other external device. This tying is the operation of associating the backup image at a specific point in time (specific generation) with the accessed volume 13 and providing the associated backup image by the access volume 13. This operation is performed, for example, by the first storage receiving a command from the second host 2.

However, because the data comprising the back image of access volume 13 is stored in export volume 12 and backup images 14a, 14b, and 14c, access is generally slower than access to the volume that stores all copy data comprising the backup image.

In FIG. 1, backup image 14c with copy number #3 is tied to accessed volume 13, and backup image 14b with copy number #2 is tied to accessed volume 16.

The management information stored in the management data volume 11, as well as the data stored in the export volume 12, a backup image of the management information is stored in the data protection area 14, and a copy number is assigned to each backup image. The backup image of management information is also tied to the management data volume 15, making it accessible from external devices. The access volume 13, management data volume 15, and access volume 16 function as normal volumes with the necessary information (e.g., volume ID) to be accessed externally.

Although the first host 1 and the fourth storage 40 are located nearby, the first storage 10 stores backup data for data in production volumes that are accessed by other remotely located hosts other than the first host 1, which is not shown in the figure, so the first storage 10 is not necessarily located near the first host 1. If the storage 10 is installed at a site remote from the first host 1, access from the first host 1 to the access volume 13 and access volume 16 are slow, and data verification of the access volume 13 takes time.

If all the data in the access volume 16 is stored in storage near the first host 1 where data verification is performed, access delays can be eliminated, and data verification operations can be accelerated.

However, the remote copy function cannot be used to store a copy of the data in a remote storage location. For example, using the remote copy function, the access volume 16 in FIG. 1 is the primary volume, the volume 22 in the second storage 20 as a secondary volume, and copying the access volume 16 to volume 22 is possible. However, this would give the existence of volume 22 and the authority to operate it to the second host 2 that operates the first storage 10. If the second host is cyber-attacked, volume 22 is at risk of being cyber-attacked from the first storage. In other words, volume operations from the second host 2 on the access volume 16 may make the access volume 16 writable and prevent correct data verification of the volume 22 that stores the copy data of the data stored in the access volume 16. This makes it impossible to restore the data in production volume 41 to its pre-cyber-attack state.

Therefore, in this embodiment, without giving the second host 2, which operates the first storage 10, the authority to operate the second storage 20, the second storage 20 managed by the user performing the data validation is installed near the first host 1. The second storage 20 creates a volume 22 for containing the backup image of the export volume 12 at a predetermined point in time (backup image of a specific generation) and provides the ability to copy all data comprising a backup image of a specific generation of export volume 12 to volume 22. Volume 22 can also be called a data verification volume due to its function.

Therefore, the second storage operation creates a virtual volume 21 that constitutes a pair of volume 22 with ShadowImage (SI), and maps the virtual volume 21 as the external source volume of UVM and the access volume 16 of the first storage 10 as the external destination volume. The second storage 20 issues a read request to the virtual volume 21 by SI and stores all data in the access volume 16 through the virtual volume 21 to the volume 22. In other words, the second storage 20 creates ShadowImage pair between virtual volume 21 and volume 22, and reads to virtual volume 21 using the copy function of ShadowImage, thereby storing, all data in the access volume 16 comprising the backup image of a specific generation in the first data protection area 14, in volume 22.

Thus, all data comprising the image of export volume 12 (production volume 41) at a given point in time can be stored in volume 22 without giving the administrator of the first storage 10 the authority to operate the second storage. Thereby the risk of cyber-attacks is reduced, and furthermore, since the first host 1 can perform data verification using the volume 22 of the second storage 20 installed nearby, the delay in sending and receiving data for data verification is reduced and verification can be performed in a shorter time.

It is important to note that the second host 2 operating the first storage 10 does not need to know the existence of the volume 22 of the second storage 20. It is also that the volume 22 contains all the data comprising the backup image of the export volume 12 at a given point in time, without giving the first storage 10 or the second host 2 that operates the first storage 10 the authority to operate the volume 22. For example, in remote copy technology, it is necessary to perform pair operations on the access volume 16 that stores the source data and the volume 22 that stores the copied data, and it is necessary to give the volume 22 operation authority to the first storage 10 and the second host 2 that operates the first storage 10. Granting this access authority allows manipulation of volume 22 and creates the risk of a cyber-attack on volume 22. For example, if the second host 2 is under cyber-attack, the data in volume 22 can be easily tampered with.

In this embodiment, for example, all data comprising the backup image of the export volume at a given point in time can be stored in volume 22 by operation of the second storage managed by the user performing data verification. Therefore, there is no need to give a third party the authority to operate the volume as in the case of remote copying, and the risk of cyber-attacks can be reduced.

On the other hand, remote copy technology cannot be used as a means of storing the data in the access volume 16 of the first storage 10 on a volume of storage located at a remote site. Therefore, if the first storage 10 fails, restoration cannot be performed using backup images of any of the multiple generations stored in the data protection area 14.

Therefore, a third storage 30 is installed at a location away from the first storage 10, the third storage 30 is connected to the first storage 10, and all or part of the multi-generation backup images stored in the data protection area 14 are stored in the third storage 30 without using remote copy technology.

Therefore, a user who wishes to remotely store all or a portion of the multi-generation backup images stored in the data protection area 14 creates a volume 33 or data protection area 35 for storing all or part of the multi-generation backup images in a third storage 30 located at a remote site from the first storage 10. The operation of copying all or part of a multi-generation backup image to volume 33 is briefly described below.

The third storage 30 create a volume 33 that contains copies of all data comprising all or some of the backup images of multiple generations, and create a virtual volume 32, which is the primary volume with volume 33 as the secondary volume. The controller of third storage 30 reads and copies the data in virtual volume 32 using SI to volume 33.

The third storage 30 maps the virtual volume 32 as an external source volume of UVM, the access volume 13 of the first storage 10 as an external destination volume of UVM, mapped by the external storage mapping information (hereinafter external mapping, UVM mapping, see FIG. 7). As a result, the volume 33 will then contain a copy of all data comprising the backup image stored in access volume 13. The access volume 13 is tied to a backup image of a specific generation of a multi-generation backup image stored in data protection area 14, and all data comprising the backup image of that specific generation is stored in volume 33.

Thus, a copy of all data comprising the backup image to be stored can be stored in volume 33 without having to give the third storage 30 operating authorities to the first storage 10 or the second host 2 operating the first storage 10.

The data stored in volume 33 can be further stored in data protection area 35, which allows the backup image to be stored in a more robustly protected state. Storing backup images from volume 33 to data protection area 35 is identical to storing backup images from export volume 12 to data protection area 14, so the explanation is omitted. Instead of data protection area 35, the volume 33 can be used as a data protection area by setting volume 33 to be write-protected for a predetermined period of time.

When the data stored in volume 33 is to be verified by the first host 1, a virtual volume 34 that is SI-paired with volume 33 is created in the third storage 30. This virtual volume 34 is registered in the external mapping (UVM mapping) information as the source volume and the access volume 16 of the first storage 10 as the destination volume. In FIG. 1, the access volume 16 is tied to the backup image 14b, but this tie is naturally broken when it is mapped to the virtual volume 34.

The first host 1 issues a command to create a volume 22 on the second storage 20 that contains the data comprising the backup image for data verification. The second storage creates a virtual volume 21 that forms an SI pair with volume 22 in the second storage 20, set access volume 16 of the first storage device 10 as external destination volume, and registers UVM mapping information with the virtual volume 21 as UVM source volume.

With the above configuration, volume 22 stores a copy data by reading data from the access volume 16 via the virtual volume 21 with SI. A user of the third storage 30 that stores data remotely can write the data, comprising the backup image to be stored in volume 33, via virtual volume 34, to the access volume 16.

The user verifying the backup data may own or manage a third storage 30 that is remotely located or a second storage 20 that is located near the first host 1 and contains a volume that stores the data for data verification. These data comprising a backup image of a specific generation for data verification can be stored in volume 22 of the second storage 20 installed near the first host 1 that performs data verification, without giving the second host 2 that operates the first storage 10 or the first storage 10 the authority to operate the third storage 30 or the second storage 20. Therefore, there is a reduced risk of cyber-attack from the first storage 10 or the second host 2 that operates the first storage 10, and the data for verification can be stored in the second storage 20, which is located near the first host 1, eliminating access delays and improving data verification speed.

<Hardware Configuration>

Figure 2:
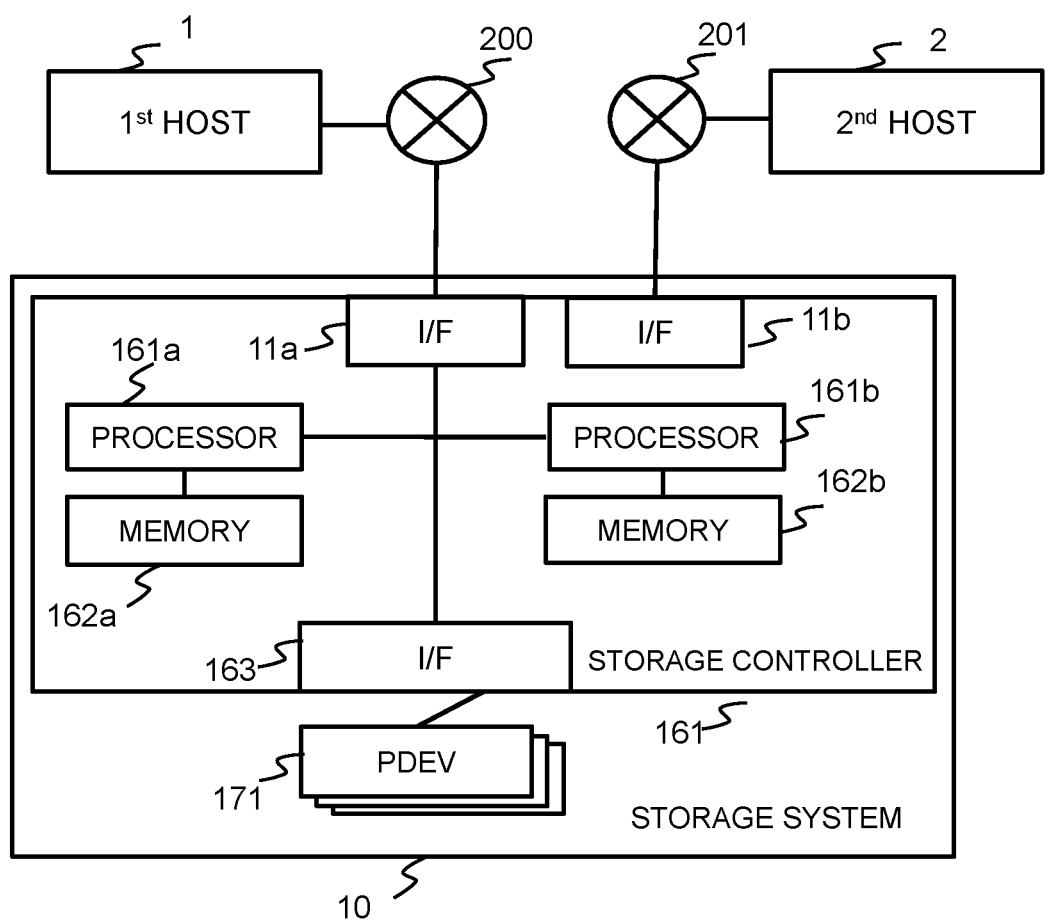
FIG. 2 shows a block diagram of an example hardware block configuration of a storage device in this embodiment.

FIG. 2 shows a block diagram of an example hardware block configuration of a storage device.

The storage devices include the first storage 10, second storage 20, third storage 30, and fourth storage 40.

In FIG. 2, the first storage 10 is used as an example, but other storage have similar configurations. The first storage 10 is composed of multiple (or one) physical storage devices PDEV 171, and a storage controller 161 connected to the PDEV 171.

The storage controller 161 comprises I/F 11a, I/F 11b, I/F 163, memory 162, and processor 161 coupled to them. I/F 11a, I/F 11b, I/F 163 are examples of interface sections. The memory 162 is an example of a memory section. The processor 161 is an example of a processor section.

I/F 11a is a communication interface device that exchanges data between the first host 1 and the fourth storage 40 and the storage controller 161. I/F 11a is coupled to the first host 1 and the fourth storage 40 via the Fibre Channel (FC) network 200.

The first host 1 and/or the fourth storage 40 sends an I/O request (write or read request) to the storage controller 161 specifying the I/O destination (for example, a logical volume number such as LUN (Logical Unit Number) or a logical address such as LBA (Logical Block Address)).

I/F 11b is a communication interface device that exchanges data exchange between the second host 2 and the storage controller 161. A second host 2 is coupled to I/F 11b via an IP (Internet Protocol) network 201.

Network 200 and network 201 maybe the same communication network. The second host 2 manages the first storage 10.

I/F 163 is a communication interface device that exchanges data between multiple PDEVs 171 and storage controller 161. A second host 2 is coupled to I/F 11b via an IP (Internet Protocol) network 201.

Memory 162 stores programs to be executed by processor 161 and data to be used by processor 161. Processor 161 executes the program stored in memory 162. For example, the memory 162 and processor 161 are duplexed.

The configuration of the first storage 10 is shown, but other storage also has the same I/F. The second storage 20 is coupled to the first storage 10 and the first host 1, and the third storage 30 is coupled to the first storage 10, the third host 3, and the fourth storage 40 is coupled to the first storage 10 and the first host 1.

There are several techniques to back up original data in case of data loss due to storage system failure, human error, and data tampering by ransomware or other means.

<Management Data>

Figure 3:
FIG. 3 shows an example of backup data management information in this embodiment.

FIG. 3 shows an example of backup data management information in this embodiment.

Backup data management information 300 is stored in management data volumes 11, 15, and 31 as management information. The backup data management information 300 is a list of backups stored in the data protection area 14 of the first storage 10 and is updated when a new backup is acquired.

Backup data management information 300 correspondingly manages export volume ID 301, copy number 302, backup date and time 303, and copy acquisition date and time 304. The export volume ID 301 is an information to identify the export volume, such as export volume 12. In FIG. 1, only one export volume 12 is illustrated, but in reality, there are multiple export volumes 12. The copy number 302 is a number for each backup image that is taken when the data in the export volume begins to be stored in the data storage area 14 with Thin Image at the backup date and time 303. The backup date and time 303 is the date and time indicating when the backup data was made. The backup date and time 303 may be the date and time information when the data in the export volume begins to be stored in the data storage area 14 with Thin Image. The copy acquisition date and time 304 is an information indicating the date and time when the copy was performed. The copy acquisition date and time 304 can be the time information when the data in the export volume has been completed stored in the data storage area 14 with Thin Image.

Figure 4:
FIG. 4 shows an example of access VOL information (volume for access information) in this embodiment.

FIG. 4 shows an example of access VOL information in this embodiment.

Access VOL information 400 is stored in management data volumes 11, 15, and 31 as management information.

The access VOL information 400 correspondingly manages the export volume ID 401, access volume ID 402, and usage 403 as management information.

The export volume ID 401, like the export volume ID 301, is an information used to identify the export volume 12. The access volume ID 402 is an information to identify the access volumes 13 and 16. The usage 403 is an information indicating the usage of the access volume identified by the access VOL ID 401. For example, information on the usage such as verification, restore of backup image, or further backup of backup image is stored.

FIG. 5 shows an example of the tied information of copy number and access Vol in this system. The tied information 500 between copy numbers and access vols is stored in management data volumes 11, 15, and 31.

The tied information 500 correspondingly manages the export volume ID 501, access volume ID 502, and tied copy number 503. The export volume ID 501 is the same information used to identify the export volume 12 as the export volume ID 301 and export volume ID 401. The access volume ID 502, like the access volume ID 402, is an information used to identify the access volumes 13 and 16. The tied copy number 503, like copy number 302, is an information that identifies the backup image.

FIG. 6 shows an example of the access volume backup available time period information. The access Vol backup available time period information 600 is stored in management data volumes 11, 15, and 31 as management information. The access vol backup availability time period information 600 maintains a list of time periods when backup data can be pulled from the third storage 30 with an external connection (with UVM) to the access Vol.

The access volume backup available time period information 600, includes the storage ID 601, export volume ID 602, access volume ID 603, preparation start time 604, access available start time 605, and access available end time 606, and manages them to each other correspondingly.

Storage ID 601 is information to identify the storage device. The export volume ID 602 is information to identify the export volume 12 the same as the export volume ID 301, export volume ID 401, and export volume ID 501. The access volume ID 603 is information for identifying the access volumes 13 and 16 as the same as the access volume ID 402 and the access volume ID 502. The preparation start time 604 is the time information to start preparation to start accessing access volumes 13 and 16. Access available start time 605 is the start time information at which access to the access volumes 13 and 16 becomes possible. Accessible end time 606 is the time information when the accessible state to the access volumes 13 and 16 ends. Storage ID 601 can also be excluded from management because the storage where the export volume resides is self-explanatory.

FIG. 3 to FIG. 6, backup data management information 300, access VOL information 400, tied information 500, and access volume backup available time period information 600 are stored as management information on the management data volume 11. And management data are accessible from the second host 2 and the third host 3 as management information, with external connection (UVM) to the virtual volume 31 of the third storage 30. In this case, it is set so that the management information can be read and written from the second host 2, but only read from the third host 3. In FIG. 1, the LAN between the second and third hosts is isolated, but if it is not necessary to isolate the LAN between the second and third hosts, an API can be provided to pass management information from the second host 2 to the third host 3 via the network.

FIG. 7A shows an example of external mapping (UVM mapping) information maintained by the second storage 20 in this embodiment.

The external mapping information 700 is managed by the source storage device (second storage 20 has original data) and is not accessible from the destination storage (storage (first storage 10).

The external mapping information 700 manages the virtual volume ID 701 of the external source storage, the external destination storage ID 702, the access volume ID 703 of the external destination storage, and the connection state 704 correspondingly.

The virtual volume ID 701 of the external source storage is information to identify the virtual volume created in the external source storage. The external storage ID 702 is information to identify the external storage. In case of FIG. 1, the second storage 10 is external destination storage. The access volume ID 703 of the external destination storage is information to identify the access volume of the external destination storage that is mapped to the virtual volume ID 701 of the external source storage device (second storage 20). The connection status 704 is information indicating the connection relationship between the volume identified by the virtual volume ID 701 and the access volume ID 703. In the case of "connected", virtual volume ID 701 and access volume ID 703 are connected, and I/O requests to the virtual volume are transferred to the access volume via the virtual volume, I/O is processed, and data stored in the access volume can be accessed via the virtual volume. If the connection status 704 is "disconnected", access to the access volume through the virtual volume is disabled. The external mapping information 700 does not basically require information to identify the external source storage, but may be managed with an external source storage ID.

FIG. 7b shows an example of storage external mapping (UVM mapping) information maintained by the third storage 30 in this embodiment. As in FIG. 7a, the external mapping information 710 is managed by the source storage device (the third storage 30) and is not accessible from the destination storage (the first storage 10).

The external mapping information 710 manages the virtual volume ID 711 of the external source storage, the external destination storage ID 712, the access volume ID 713 of the external destination storage, and the connection state 714 correspondingly.

The virtual volume ID 711 of the external source storage is information to identify the virtual volume created in the external source storage. The external storage ID 712 is information to identify the external storage. The access volume ID 713 of the external destination storage is information to identify the access volume of the external destination storage that is mapped to the virtual volume ID 711 of the external source storage device (third storage 30). The connection state 714 is information indicating the connection relationship between the volume identified by the virtual volume ID 711 and the access volume ID 713. In the case of "connected", the volumes identified by the virtual volume ID 711 and the access volume ID 713 are connected, I/O requests to the virtual volume are transferred to the access volume via the virtual volume, I/O is processed, and the data stored in the access volume can be accessed via the virtual volume. When the connection status 714 is disconnected, access to the access volume via the virtual volume is disabled. Although information to identify the storage from which the external connection is made is basically unnecessary in the external mapping information 710, the external source storage ID may be attached and managed.

FIG. 8 shows an example of backup data management information managed by the third storage in this embodiment.

Backup data management information 800 is backup information that is independently managed by the third host 3 and is stored in the second management data volume 36 of third storage 30.

The backup data management information 800 manages the volume ID 801, the backup date and time 802, and copy acquisition date and time 803.

Volume ID 801 is information to identify the volume 33 that stores the backup data. Backup date and time 802 is date and time information indicating when the backup data was made. The copy acquisition date and time 803 is the date and time when the copy was performed on the third storage 30.

<Common Operation>

Figure 9:
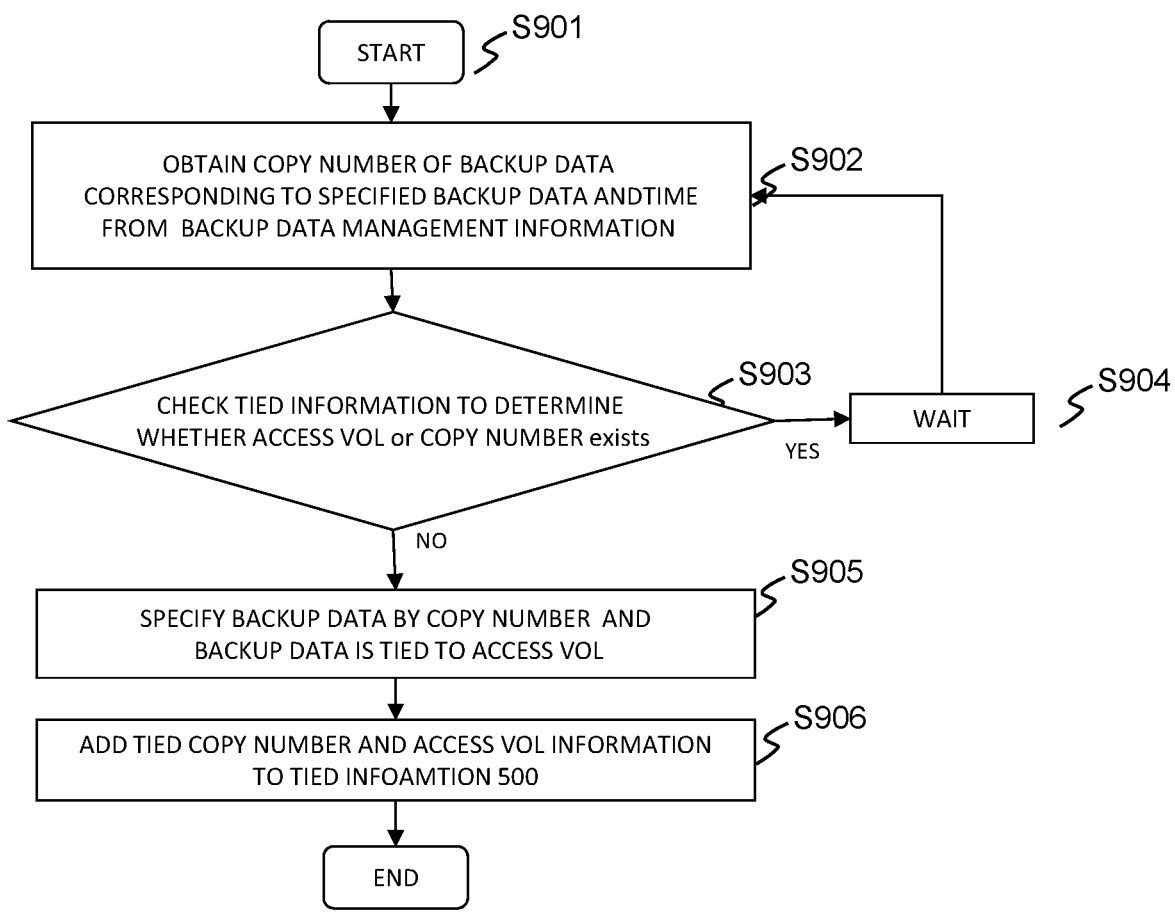
FIG. 9 is a flowchart showing an example of the processing of common operation 1-1 (tying backup data and access vol) in this embodiment.

FIG. 9 is a flowchart showing an example of the processing of common operation 1-1 (tying backup data and access volumes) in this embodiment. In the first storage 10, before the process of FIG. 9 is started, the backup images 14a, 14b, 14c at multiple points in time of the export volume 12 have been created. Each backup image can be specified by its copy number.

The tying of backup data and access volume in common operation 1-1 is performed in the first storage 10. The tying is done by the Thin Image secondary volume mapping, which is a mapping of the existing snapshot of the Thin Image pair.

The process shown in FIG. 9 is performed in the first storage 10.

At step S901, the first storage 10 receives a tie-in execution instruction from the second host 2 specifying the export volume ID and the backup date and time.

At step S902, the first storage 10 obtains copy number of backup data corresponding to the specified backup date and time from the backup data management information 300.

At step S903, the first storage 10 checks the tied information 500 to determine whether either access vol 502 or copy number 503 exists. If the judgment result is YES, the copy number and the access volume are already tied together, and the first storage 10 waits for a certain period of time in step S904. If the judgment result is NO, the state is that they are not tied together and proceeds to step S905.

In step S905, by the copy number obtained in step S902, the backup image is specified and tied to the access volume. For example, copy number #3 is attached to the access volume 13 shown in FIG. 1, and the backup image 14c is accessible via the access volume 13. The backup image 14c can be accessed via the access volume 13.

In step S906, add the tied copy number and access vol information to the tied information 500.

By the above operations, the backup image corresponding to the specified backup date and time of the specified export volume can be tied to the access volume 13 or the access volume 16, and the backup image can be provided to an external device.

Figure 10:
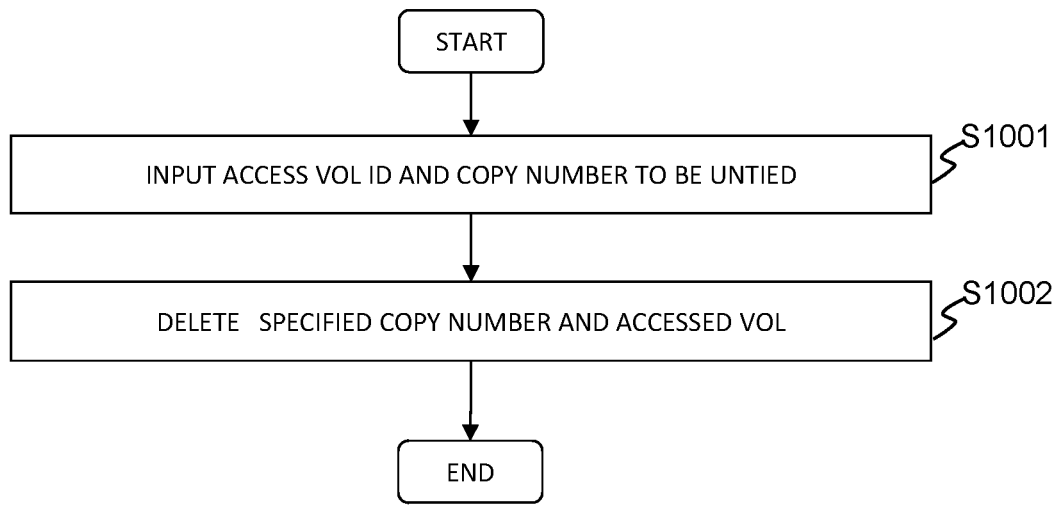
FIG. 10 is a flowchart showing an example of the process of common operation 1-2 (untying backup data and access vol) in this embodiment.

FIG. 10 is a flowchart showing an example of the process of common operation 1-2 (untying backup data and access volume) in this system.

This process is used to break (untie) the relationship between the backup data and the access volume managed in tied information in FIG. 5. The process shown in FIG. 10 is performed in the first storage 10. This is unmapping operation of the secondary volume of Thin Image pair. In other words, it is the operation of unassigning the secondary volume to the snapshot data of Thin Image pair.

When the process starts (S1001), in step S1001, the access volume ID and the copy number to be untied are entered into the first storage 10.

In step S1002, from the tied information 500 shown in FIG. 5, the corresponding entry is deleted and the association between the specified access volume ID and the copy number is cancelled (untied).

The untying of the copy number and the access volume is always performed in the first storage 10. The untied operation is performed by unmapping the secondary volume of the Thin Image. That is, the secondary volume of the Thin Image pair is unmapped to the snapshot data.

Figure 11:
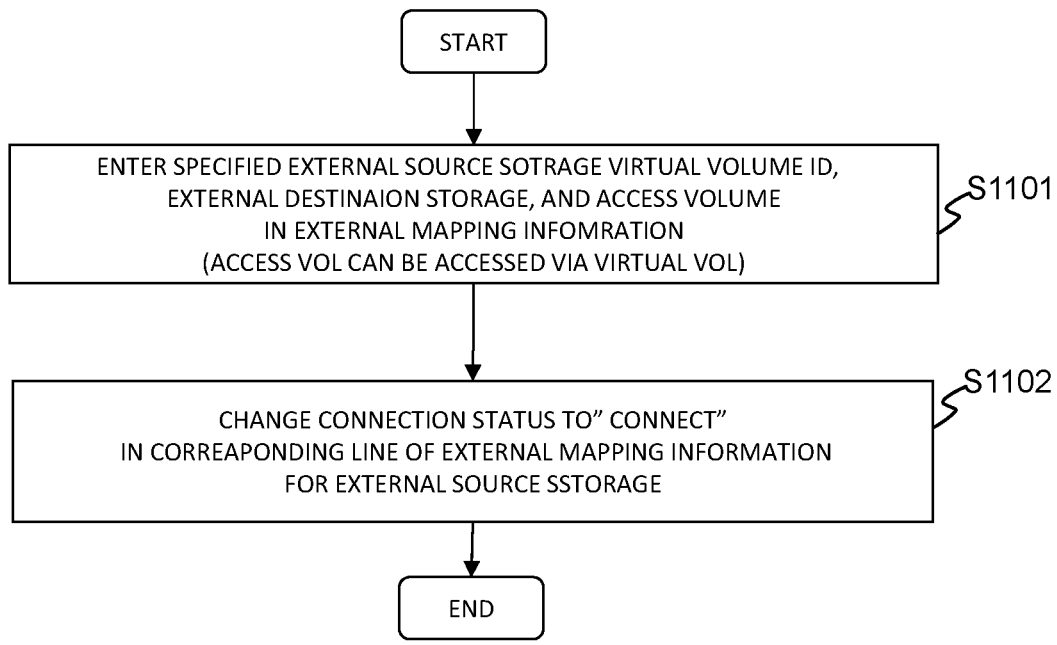
FIG. 11 is a flowchart showing an example of the processing of common operation 2-1 (process for accessing the access vol of the external storage) in this embodiment.

FIG. 11 is a flowchart showing an example of the processing of the common operation 2-1 (the processing to access the access volume of the external storage, in other words, UVM connection setting operation) in this embodiment.

Common operation 2-1 is performed on the external source storage (second storage 20, third storage 30).

In step S1101, the specified external source storage virtual volume ID, external destination storage ID and the access volume ID are entered into the external mapping information. For example, the third storage 30 is the external source storage, the virtual volume 32 is specified for the external source storage virtual volume ID 711, the first storage 10 is entered as the external destination storage ID 712, and volume 13 is entered as the external destination storage access volume 713.

In step S1102, the connection status is changed to "connected" in the corresponding line of the external mapping information for the external source storage.

The process shown in FIG. 11 transfers I/O requests for the virtual volume to the access volume via the virtual volume, I/O is processed, and the data stored in the access volume can be accessed via the virtual volume.

Figure 12:
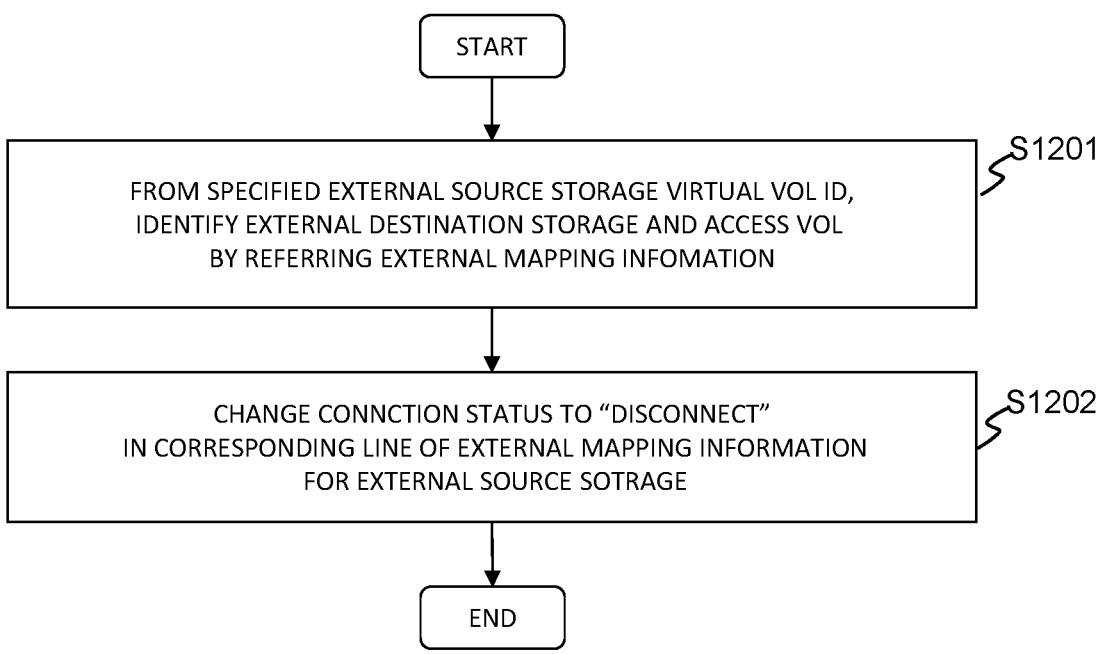
FIG. 12 is a flowchart showing an example of the process of common operation 2-2 (release of external storage)

FIG. 12 is a flowchart showing an example of the process of common operation 2-2 (release of external connection) in this embodiment. The process in FIG. 12 is executed on the external source storage having virtual volumes.

In step S1201, enter the specified external source storage virtual volume ID for release of external connection, refer to the external mapping information (FIG. 7) to identify the external destination storage and access volume.

In step S1202, change the connection state corresponding to the identified external destination storage and access volume in step 1201 to "disconnected".

The process in FIG. 12 breaks the external connection between the virtual volume of the source storage and the access volume of the destination storage.

<Use Case 1 (UC1)>

Use case 1 is to store a copy of all data comprising the backup image of the access volume 16 of the first storage 10 in volume 22 of the second storage 20 located near the first host 1 performing the data validation.

In Use Case 1, as a preparation, a second storage 20 is installed near the first host 1 where data verification is performed, and creates a volume 22 that contains a copy of all the data in the backup image on the second storage 20.

FIG. 13 is a flowchart showing an example of the process of use case 1 (UC1), restoring data to normal volume, in this embodiment.

At step S1301, when the first storage 10 receives a restore instruction from the second host 2 that specifies the backup date and time and access volume ID, the first storage 10 executes common operation 1-1. In other words, the first storage 10 refers to the backup data management information 300 from the specified backup date and time to obtain the copy number 302. If the obtained copy number is #2 and the specified access volume is "16," the backup image 14b identified by copy number #2 is tied to the access volume 16 (see FIG. 1).

At step 1302, when the second storage 20 receives an external connection (UVM connection) instruction from the first host 1, performs common operation 2-1. In other words, in the external mapping information 700 of the second storage 20, the access volume 16 of the first storage 10 is mapped as the external destination access volume and the virtual volume 21 of the second storage 20 as the external source storage virtual volume, and the connection status is "connected".

In step S1303, the second storage 20 copies the data of the virtual volume 21 to the user-specified volume 22. Copying data to volume 22 was described in FIG. 1, so the details are omitted here.

At step S1304, the second storage 20 performs the common operation 2-2. In other words, the relationship between the virtual volume 21 of the second storage 20 and the access volume 16 of the first storage 10 is dissolved (disconnected).

At step S1305, the first storage 10 executes common operation 1-2 under instructions from the second host 2. That is, the first storage 10 unties the access volume 16 and the backup image 14b.

This allows the user to operate the volume of the second storage without giving the authorization to operate the volume on the storage 10 side of the first storage, the first host where the data verification is to be performed. All data comprising the image of the export volume 12 at the specified date and time can be stored in the volume 22 of the second storage 20 located near the first host 1 where the data verification is performed. Therefore, data for data verification can be stored near the first host 1, which speeds up data verification.

The data stored in volume 22 is not limited to data verification, but can be used for any purpose that is accessed by the first host 1.

<Use Case 2 (UC2)>

Use case 2 is where a backup image of a predetermined generation of the exported volume 12 stored in the data protection area 14 of the first storage 10 is stored in the remotely located volume 33 and data protection area 35 of the third storage 30.

In Use Case 2, as a preparation, a third storage 30 is remotely installed and a volume 33 for containing all the data comprising the backup image of a given generation is created.

FIG. 14 shows an example of the use case 2 (UC2) in this embodiment, backup process to the second protected area 35.

In step S1401, the first storage 10 executes common operation 1-1 with the backup date and time and the access volume (for backup) specified by the user according to the instructions from the second host 2. For example, the first storage 10 refers to the backup data management information 300 based on the specified backup date and time, and identifies copy number #3. And ties the access volume 13 to the backup image 14c corresponding to the identified copy number #3.

In step S1402, the third storage 30 executes common operation 2-1 in accordance with an instruction from the third host 3, the first storage 10 as the external destination and the third storage 30 as external source. That is, the virtual volume 32 of the third storage 30 is attached to the access volume 13 of the first storage 10. In other words, the virtual volume 32 of the third storage 30 is registered in the external mapping information 710 in order to external connection to the access volume 13 of the first storage 10.

In step S1403, copying data from the virtual volume 32 to the user-specified volume 33.

In step S1404, the third storage 30 adds new backup information to the second backup data management information stored in the second management data volume 36. This second backup data management information (FIG. 8) corresponds to the backup data management information 300 of the first storage 10. The export volume ID 301 in FIG. 3 identifies the access volume 13. The information that identifies the backup image 35a in the data protection area 35 is the copy number.

In step S1405, the third storage 30 executes common operation 2-2. That is, the connection status of the external mapping information between the virtual volume 32 of the third storage 30 and the access volume 13 of the first storage 10 is changed to "disconnected".

In step S1406, at the first storage 10 executes common operations 1-2. That is, the linkage between the access volume 13 and the backup image 14c of the first storage 10 is untied.

The process shown in FIG. 14 allows a portion of the multi-generation backup image stored in the data protection area of the first storage, via the access volume 13, and the virtual volume 32 of the third storage 30, can be stored in the data protection area 35 as backup image 35a in the third storage 30 without granting operating authority to the first storage 10.

FIG. 15A is a flowchart showing another example of use case 2 (UC2), the process of backup to the second protected area in this embodiment.

The process in FIG. 15A is performed in the first storage 10 with an instruction from the second host 2.

At step S1501, the first storage 10 determines whether the current time has reached preparation start time of the access volume backup available time period information 600.

If the judgment result of step S1501 is NO, go to step S1502, wait for a certain period of time, and return to the start step.

If the result of the decision in step S1501 is YES, go to step S1503 to perform common operation 1-1 by specifying the latest backup time, and the access volume 13 of the access volume backup available time period information 600. In other words, in the tied information 500, tying the access volume 13 of the first storage 10 and the backup image 14c, and proceeds to step S1504.

In step S1505, whether the current time has reached the access available end time of the access volume backup available time period information 600. If the judgment result indicates that the time has not reached the time, it becomes NO, goes to step S1505, waits for a certain period of time, and then performs step S1504.

If the judgment result is reached, go to step S1506 and common operation 1-2 is executed. That is, unties the access volume 13 and the backup image 14c of the first storage 10.

Figure 15B:
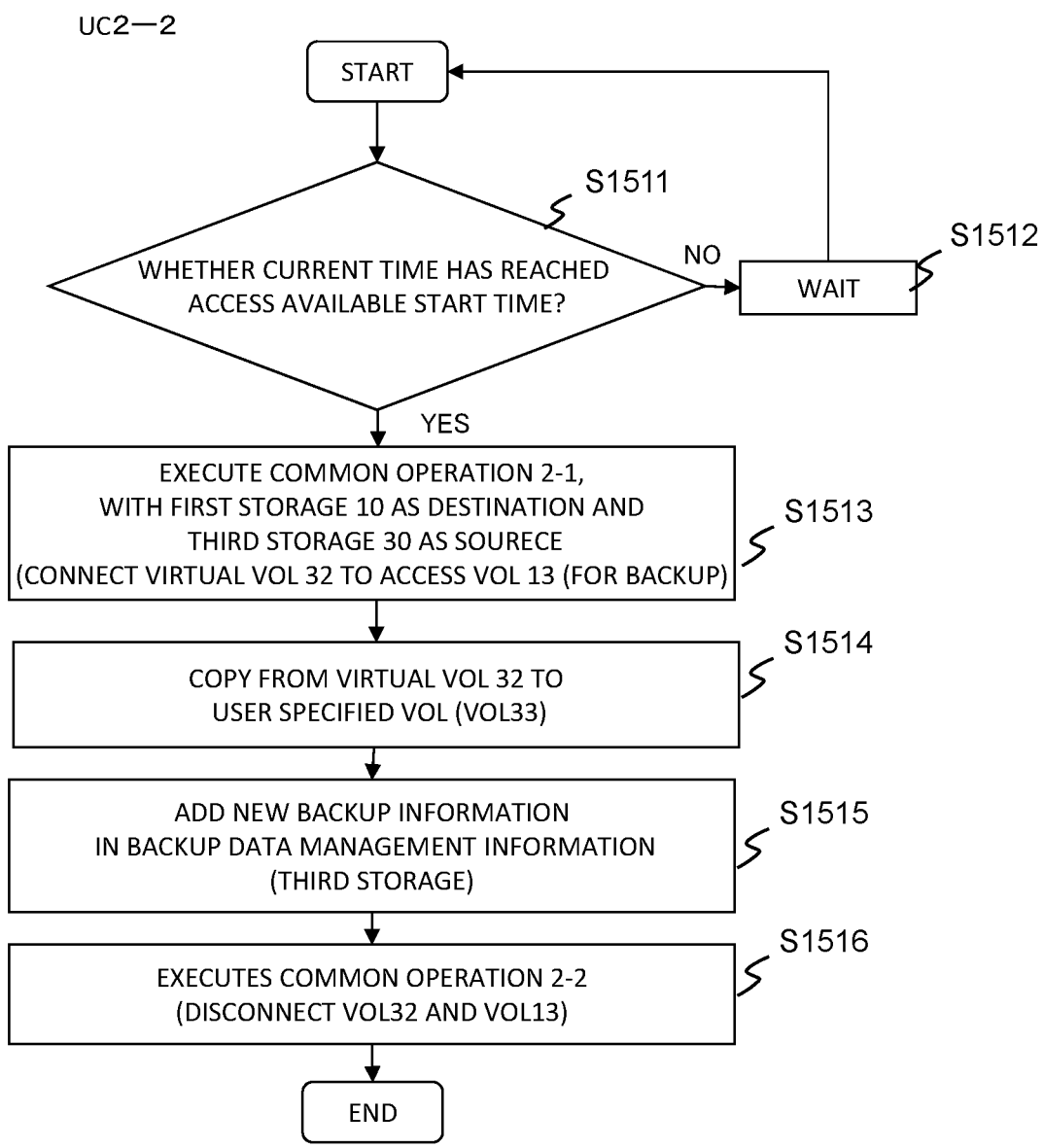
FIG. 15B is a flowchart showing an example of the process of backup to use case 2 (UC2), second protected area in this embodiment.

FIG. 15B is a flowchart showing an example of use case 2 (UC2), the process of backup to the second protected area in this embodiment.

The process in FIG. 15B is performed in the third storage 30 by an instruction from the third host 3.

In step S1511, the third storage 30 determines whether the current time has reached the access available start time of the access volume backup available time period information 600. If the current time has not reached, the judgment result is NO, and the third storage 30 goes to step S1512, waits for a certain period of time, and returns to the start step.

If the current time has reached the access available start time, the result of the judgment is YES, and the operation proceeds to step S1513. Executes common process 2-1, with the first storage 10 as the external destination and the third storage 30 as the external source. That is, the virtual volume 32 of the third storage 30 is registered in the external mapping information as the external source volume and the access volume 13 of the first storage 10 as the external destination volume.

Next, in step S1514, copy data from virtual volume 32 of the third storage 3 to a user-specified volume 33.

In step S1515, add new backup information in the backup data management information (second managed data volume 36).

At step S1516, common operation 2-2 is performed. That is, the virtual volume 32 of the third storage 30 and the access volume 13 of the first storage 10 is disconnected (the connection status of the external connection mapping information is changed to disconnected).

By the process shown in FIGS. 15A and 15B, the time period when backup to the external source storage is possible (Access Vol Backup Available Time Period Information) is determined in advance, and the second host 2 and the third host 3 start operation at the pre-determined time, respectively.

Since the operation from the third host 3 to the first storage 10 is no longer necessary, the network connection 17 shown in FIG. 1 can be made unnecessary. Both storage access rights and the network can be separated on the first storage 10 side and the third storage 30 side.

<Use Case 2+1 (UC2+1)>

Use Case 2+1 combines Use Case 2 with Use Case 1, and combines the backup image stored on a remotely located storage with the backup image stored on a storage near the host. This is a use case where all data comprising the backup image is stored and used for data verification, for example.

Figure 16A:
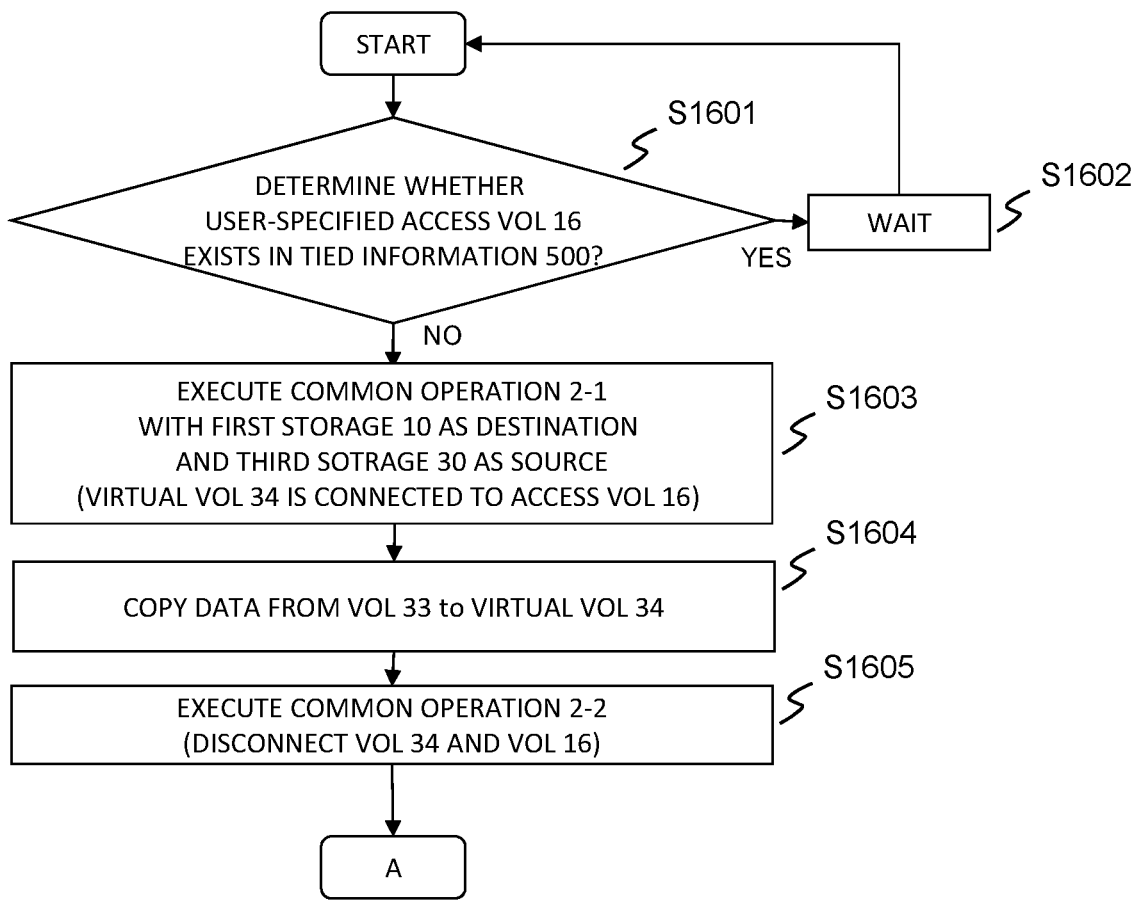
FIG. 16A is a flowchart showing an example of the restore process, combining use case 2 and use case 1 in this embodiment (UC2+UC1)

FIG. 16A is a flowchart showing an example of a restore process that combines use case 2 and use case 1 in this embodiment (UC2+UC1).

The process in FIG. 16A is performed by the third storage 30 receiving an instruction from the third host 3. This instruction specifies the backup image to be restored from among the backup images stored by the third storage 30 and ties it to volume 33. Since this restore process is similar to the process in which the first storage ties the backup image stored in the data protection area to volume 13 and access volume 16 for access, a detailed explanation is omitted.

In step S1601, determine if the user-specified access volume 16 exists in the 500 tied information. If the judgment result shows that the tying information exists, the result is YES, and the system proceeds to step S1602, waits for a certain period of time, and then returns to the start step.

If the judgment result shows that there is no tied information, the result is NO, and the operation proceeds to step S1603. The common operation 2-1 is executed with the first storage 10 as the external destination and the third storage 30 as the external source. That is, the virtual volume 34 of the third storage 30 is the source of the external connection, and the access volume 16 of the first storage 10 is the destination of the external connection, mapped and bound by the external mapping information. Update the connection status of the external information to "connected."

In step S1604, at the third storage 30, copies data from the volume 33 to the virtual volume 34.

At step S1605, common operation 2-2 is performed. That is, the virtual volume 34 of the third storage 30 and the access volume 16 of the first storage 10 are disconnected. The connection status of the external mapping information is changed to "disconnected."

The process in FIG. 16B is a continuation of the process in FIG. 16A, but with the second storage 20 receiving instructions from the first host 1.

In step S1611, common operation 2-1 is performed with the first storage 10 as the external destination and the second storage 20 as the external source. That is, the virtual volume 21 of the second storage 20 is the source volume and the access volume 16 of the first storage 10 is the destination volume, registered in the external mapping information and connected.

In step S1612, the second storage 20 copies data from the virtual volume 21 to the volume 22 designated as the restore destination volume.

At step S1613, common operation 2-2 is performed. That is, the external connection between the virtual volume 21 and the access volume 16 is disconnected.

<Relationships Between Volumes>

Figure 17:
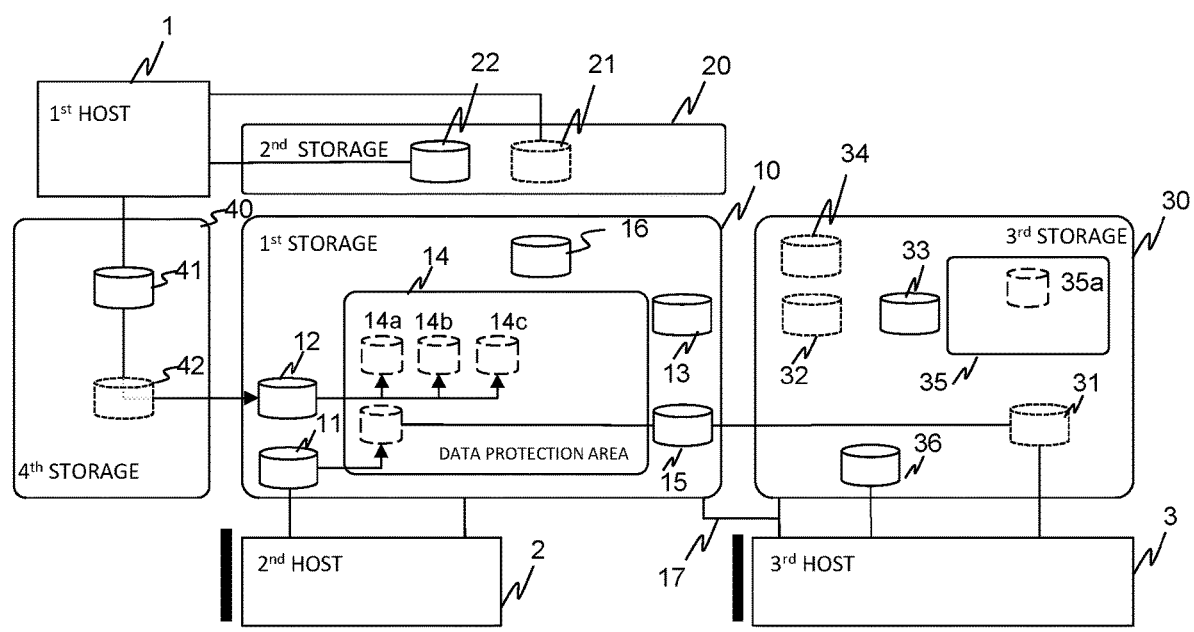
FIG. 17 shows an example of the initial state of the overall configuration of the example system.

FIG. 17 shows an example of the relationship between volumes in the initial state of the overall configuration example of the system.

The first host 1 accesses the production volume 41 of the fourth storage 40. Virtual volume 42, which pairs production volume 41 with ShadowImage, is used as the external source virtual volume, and export volume 12 is used as the external destination volume for UVM.

Backup images of the export volume 12 at different points in time are stored in the data protection area 14. The management information that manages the backup images is stored in management data volume 11, with virtual volume 31 as the external source virtual volume, and the management information stored in management data volume 15 can be accessed.

In this state, the access volumes 13 and 16 are not tied to any backup images 14a, 14 b, and 14c.

Figure 18:
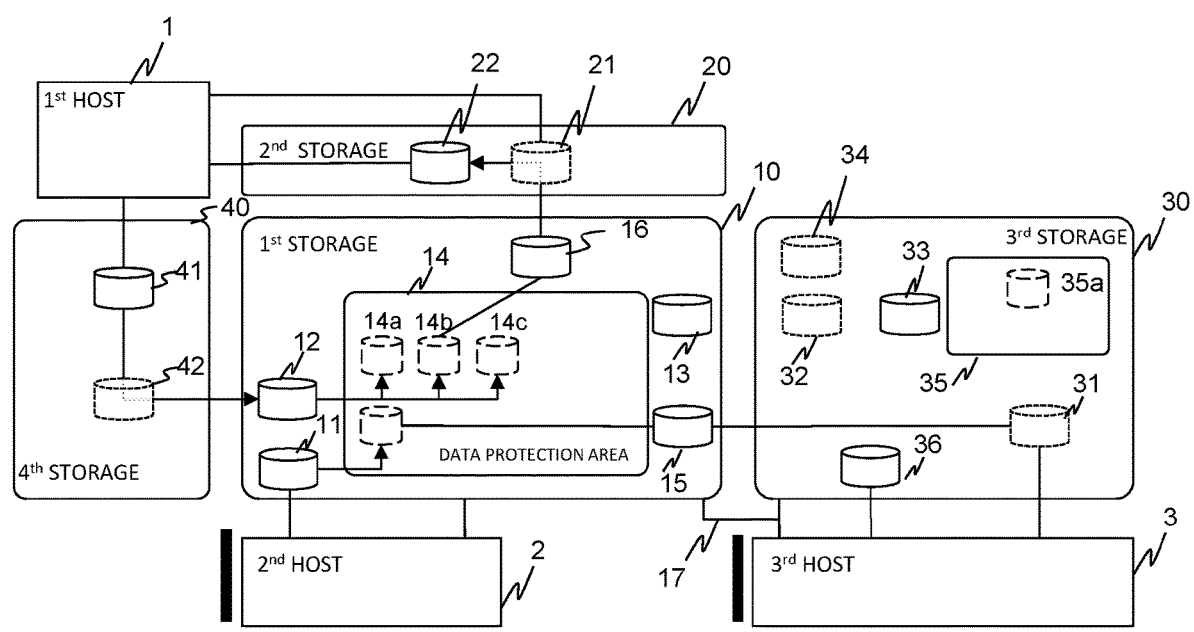
FIG. 18 shows an example of Use Case 1 (UC1) of the overall configuration example of the system in this embodiment.

FIG. 18 shows the relationship between volumes in Use Case 1 (UC1) of the overall configuration example of the system.

The access volume 16 is tied to the backup image 14b at a predetermined time in the data protection area 14, and external devices can access the access volume 16 to access the predetermined time backup image of the export volume.

A user, who wishes to access a backup image at a predetermined time in the data protection area 14 or to perform data verification of a backup image at a predetermined time in the data protection area 14, installs the second storage 20 near the first host 1, and creates a volume 22 to restore and store all the data comprising the backup image of the predetermined time of the data protection area 14.

The second storage 20 creates a virtual volume 21 that constitutes a pair of volume 22 of ShadowImage and makes the data in the virtual volume 21 ready to be copied to volume 22.

In the second storage 20, the virtual volume 21 is mapped as the source virtual volume and the access volume 16 is mapped as the destination volume. And the connection state is set to "connect." Thereby, the data comprising the backup image 14b at a given time, which is tied to the access volume 16 access, is stored in volume 22 with the ShadowImage copy operation. The external connection to the access volume 16 is disconnected except when transferring data.

The first host 1 can access or verify data stored in volume 22 at high speed.

Figure 19:
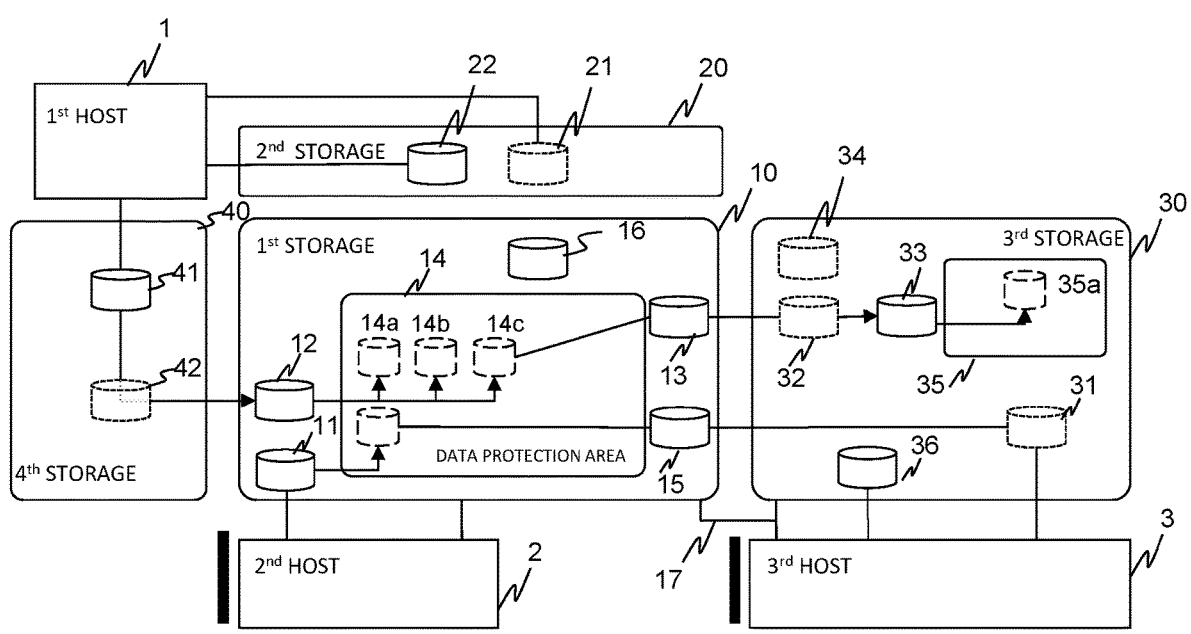
FIG. 19 shows an example of Use Case 2 (UC2) of the overall configuration example of the system in this embodiment.

FIG. 19 shows the relationship between volumes in use case 2 (UC2) of the overall configuration example of the system.

In use case 2, a volume 33 of the remotely located third storage 30 stores a copy of the data of the backup image 14c at the predetermined time stored in data protection area 14 and is further stored the copy of the data of the backup image 14 in data protection area 35.

The third storage 30 create virtual volume 32, which is a pair of volume 33 with ShadowImage, and the virtual volume 32 is mapped as the external source virtual volume and the access volume 13 is mapped as the external destination volume using the external mapping information. By setting the connection status in external mapping information, all the data comprising the backup image 14c at a given time in the data protection area 14 is stored in volume 33 via access volume 13 by the copy function of ShadowImage.

Thin Image stores backup image 35a from volume 33 to data protection area 35 at a given time.

This allows the backup image 14c of the data protection area 14 at a given time to be stored in a remotely located third storage volume 33 and can further be stored in data protection area 35.

Figure 20:
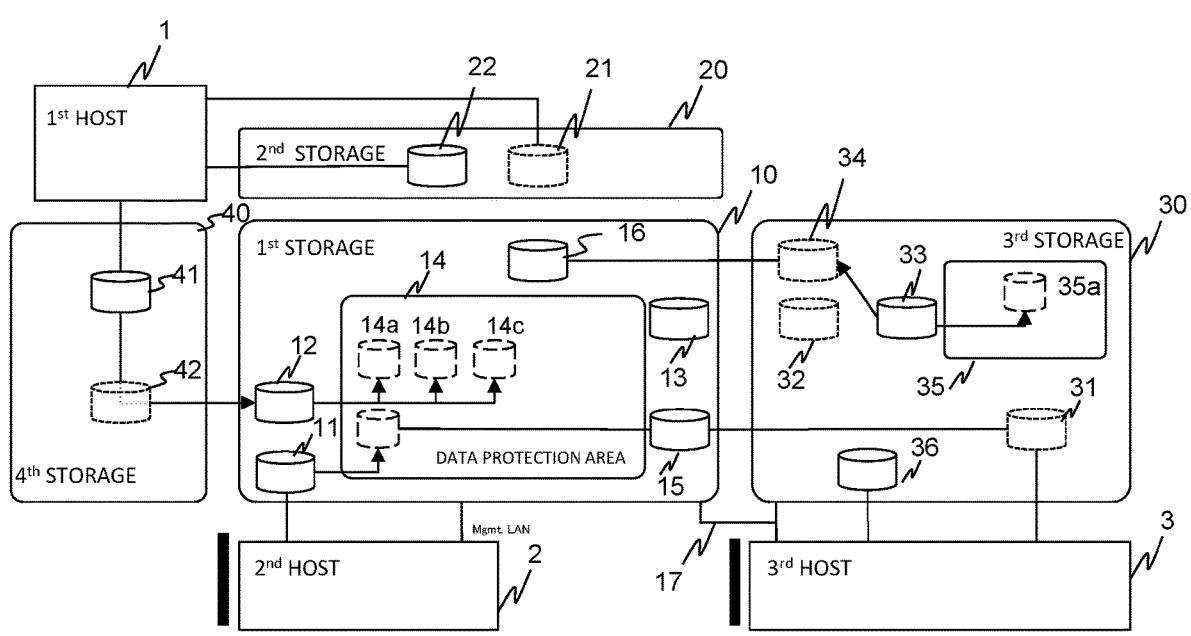
FIG. 20 shows an example of the overall configuration of the system in this form, with use case 2 (UC2) combined with use case 1.

FIG. 20 shows the relationship between volumes in combination of use case 1 (UC1) and use case 2 (UC2) of the overall configuration example of the system in this embodiment.

In FIG. 20, the third storage creates a virtual volume 34 that constitutes a pair of volume 33 of ShadowImage. The virtual volume 34 is used as the external source virtual volume, and the access volume 16 of the first storage is used as the external destination volume for UVM, virtual volume 34 and access volume 16 are connected. In this case, the access volume 16 is a volume that is not tied to any of the backup images 14a, 14b, 14c stored in the data protection area 35.

Access volume 16 will contain the data of volume 33 or the backup image at a predetermined time in data protection area 35.

Figure 21:
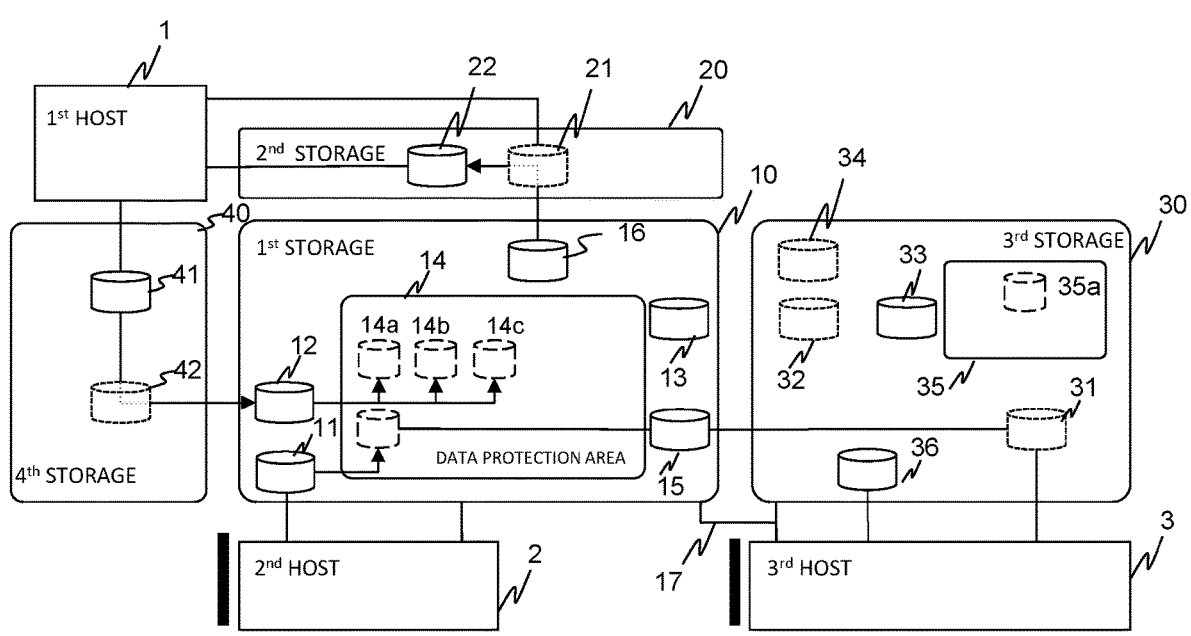
FIG. 21 shows an example of the overall configuration of the system in this embodiment, combining use case 2 (UC2) with use case 1 (UC1).

FIG. 21 shows an example of the overall configuration of the system, with use case 2 (UC2) combined with use case 1.

The second storage creates a volume 22 to store the restored data in a second storage 20 located near the first host 1 where the data verification is performed. And the second storage creates a virtual volume 21 that pairs volume 22 with ShadowImage, and virtual volume 21 is used as an external source virtual volume, and access volume 16 is used as an external destination volume, and the data stored in access volume 16 is stored in volume 22.

This allows the volume 22 to store backup data stored in a remotely located third storage 30. Therefore, the first host 1 can access or verify data stored in the volume 22 at high speed.

In Use Case 1 and Use Case 2, the second storage 20 and the fourth storage 40 may be configured with the same storage, and a volume for storing data for data verification may be created on the fourth storage 40.

As described above, according to this method, all data comprising the backup image of the export volume at a given point in time can be stored in volume 22 by operation of the second storage managed by the user who performs data verification. Since the data can be stored, there is no need to authorize a third party, such as the administrator of the first storage, to operate the volume of the second storage, as in remote copying, and the risk of cyber-attacks can be reduced.

In addition, without giving the administrator of the first storage 10 the authority to operate the second storage, the volume 22 can be used to store all the data that make up the image of the volume 12 (production volume 41) at a given point in time. The first host 1 can perform data verification using the volume 22 of the second storage 20 installed nearby, which allows the verification to be performed in a shorter time.

In addition, a copy of all data comprising the backup image can be stored in a remote volume 33 without giving the authority of the third storage 30 for the first storage 10 and the second host 2 which operates the first storage 10.

Furthermore, the data stored in volume 33 can be further stored in data protection area 35 to store the backup image in a more robust and protected state.

What is claimed is:

1. A data duplication system comprising:
a first storage having a first volume for reading and writing data by an external device, and a first data protection area for storing backup images of multiple generations of the first volume and that cannot be accessed by external devices; and
a second storage being coupled to the first storage,
wherein the first storage creates a second volume for providing backup image of a particular generation of the multiple generations of the first volume stored in the first data protection area, and
wherein the second storage:
creates a third volume for storing data comprising the backup image of the particular generation of the first volume provided by the second volume;
creates a first virtual volume forming a pair that copies the data of the backup image of the particular generation to the third volume;
makes the second volume accessible via the first virtual volume by mapping the first virtual volume as an external source and the second volume as an external destination;
reads a backup image of the second volume through the first virtual volume by copying data from the first virtual volume to the third volume; and
stores the data comprising the backup image of the particular generation of the first volume in said third volume by writing to said third volume.

2. The data duplication system according to claim 1, wherein the first virtual volume and the third volume form a ShadowImage pair, and
wherein a ShadowImage copy function reads from the first virtual volume to store all data comprising the backup image of the particular generation of the first volume, which is data from the second volume, in the third volume.

3. The data duplication system according to claim 2, wherein the first storage further comprising a management data volume for storing tied information that manages the second volume and the backup image of the particular generation of the first volume stored in the first data protection area are tied by a copy number.

4. A data duplication system comprising;
a first storage having a first volume for reading and writing data by an external device, and a first data protection area for storing backup images of multiple generations of the first volume and that cannot be accessed by external devices;
a second storage being coupled to the first storage and a host performing data verification; and
a third storage being coupled to the first storage,
wherein the first storage creates a second volume for providing a backup image of a particular generation of the multiple generations of the first volume stored in the first data protection area,
wherein the second storage creates a third volume for storing data comprising the backup image of the particular generation of the first volume provided by the second volume,
wherein the third storage:
creates a fourth volume for storing data comprising the backup image of the Particular generation of the first volume;
creates a second virtual volume forming a pair that copies the data comprising the backup image of the particular generation to the fourth volume;
makes the second volume accessible via the second virtual volume by mapping the second virtual volume as an external source and the second volume as an external destination;
reads data of backup image in the second volume through the second virtual volume by copying data from the second virtual volume to the fourth volume; and
stores the data comprising the backup image of the particular generation in the fourth volume.

5. The data duplication system according to claim 4, the third storage further comprising;
a second data protection area as an area that is inaccessible to external devices that stores backup images of multiple generations of the fourth volume.

6. The data duplication system according to claim 4, wherein the second storage:
  creates a first virtual volume which forms a copy pair to copy data to the third volume,
wherein the third storage:
  creates a third virtual volume which is paired with the fourth volume in a copy operation;
  by mapping the third virtual volume as the external source and a fifth volume of the first storage as the external destination, makes the fifth volume accessible via the third virtual volume, stores data comprising the backup image of the particular generation stored in the fourth volume in the fifth volume, and
wherein the second storage:
  maps the first virtual volume as the external source and the fifth volume of the first storage as the external destination; and
  stores data of the backup image of the particular generation stored in the fifth volume in the third volume via the first virtual volume.

7. A backup method for a data replication system comprising a first storage having a first volume for reading and writing data by an external device, and a first data protection area for storing backup images of multiple generations of the first volume and the first data protection area cannot be accessed by external devices, a second storage being coupled to the first storage, the method comprising the steps of:
  the first storage:
    creates a second volume for providing backup image of a particular generation of the multiple generations of the first volume stored in the first data protection area; and
  the second storage:
    creates a third volume for storing data comprising the backup image of the particular generation of the first volume provided by the second volume;
    creates a first virtual volume forming a pair that copies the data of the backup image of the particular generation to the third volume;
    makes the second volume accessible via the first virtual volume by mapping the first virtual volume as an external source and the second volume as an external destination;
    reads a backup image of the second volume through the first virtual volume by copying data from the first virtual volume to the third volume; and
    stores the data comprising the backup image of the particular generation of the first volume in said third volume by writing to said third volume.

8. A backup method for a data replication system comprising a first storage having a first volume for reading and writing data by an external device, and a first data protection area for storing backup images of multiple generations of the first volume and that cannot be accessed by external devices the method comprising the steps of:
  coupling a second storage being coupled to the first storage and a host performing data verification; and
  coupling a third storage to the first storage,
  wherein the first storage creates a second volume for providing a backup image of a particular generation of the multiple generations of the first volume stored in the first data protection area,
  wherein the second storage creates a third volume for storing data comprising the backup image of the particular generation of the first volume provided by the second volume,
  wherein the third storage:
    creates a fourth volume for storing data comprising the backup image of the Particular generation of the first volume;
    creates a second virtual volume forming a pair that copies the data comprising the backup image of the particular generation to the fourth volume;
    makes the second volume accessible via the second virtual volume by mapping the second virtual volume as an external source and the second volume as an external destination;
    reads data of backup image in the second volume through the second virtual volume by copying data from the second virtual volume to the fourth volume; and
    stores the data comprising the backup image of the particular generation in the fourth volume.

9. The backup method according to claim 8, wherein the second storage:
  creates a first virtual volume which forms a copy pair to copy data to the third volume,
wherein the third storage:
  creates a third virtual volume which is paired with the fourth volume in a copy operation; and
  by mapping the third virtual volume as the external source and a fifth volume of the first storage as the external destination, makes the fifth volume accessible via the third virtual volume, stores data comprising the backup image of the particular generation stored in the fourth volume in the fifth volume, and
wherein the second storage:
  maps the first virtual volume as the external source and the fifth volume of the first storage as the external destination; and
  stores data of the backup image of the particular generation stored in the fifth volume in the third volume via the first virtual volume.

* * * * *